United States Patent
Fujii et al.

[11] Patent Number: 5,929,140
[45] Date of Patent: Jul. 27, 1999

[54] COATING RESIN OF ALIPHATIC HC SOLVENT, CARBOXY-FUNCTIONAL ACRYLIC POLYMER AND POLYMER PARTICLES

[75] Inventors: Takao Fujii; Hiroaki Obata; Shunichi Yakita, all of Sano; Akira Kume, Mukou; Hiroshi Serizawa, Kazo; Takeshi Komatu, Naka-gun, all of Japan

[73] Assignee: Nippon Carbide Kogyo Kabushiki Kaisha, Tokyo, Japan

[21] Appl. No.: 08/841,582

[22] Filed: Apr. 30, 1997

Related U.S. Application Data

[62] Division of application No. 08/586,800, filed as application No. PCT/JP94/00811, May 20, 1994.

[51] Int. Cl.$^6$ .............................. C08K 5/01; C08L 33/02
[52] U.S. Cl. ........................................... 523/440; 524/522
[58] Field of Search ............................. 524/522; 523/440

[56] References Cited

U.S. PATENT DOCUMENTS

| | | | |
|---|---|---|---|
| 3,632,546 | 1/1972 | Huang et al. | |
| 4,055,607 | 10/1977 | Sullivan et al. | 524/512 |
| 4,297,448 | 10/1981 | Chang et al. | 525/154 |
| 4,427,820 | 1/1984 | Backhouse et al. | 524/504 |
| 4,558,075 | 12/1985 | Suss et al. | 524/447 |
| 5,087,286 | 2/1992 | Fukuda et al. | 525/440 |
| 5,439,748 | 8/1995 | Nakamura et al. | 526/287 |
| 5,491,192 | 2/1996 | Walker et al. | 525/230 |
| 5,539,051 | 7/1996 | Satou et al. | 523/213 |

FOREIGN PATENT DOCUMENTS

| | | |
|---|---|---|
| 60-123563 | 7/1985 | Japan . |
| 60-221469 | 11/1985 | Japan . |
| 62-220564 | 9/1987 | Japan . |
| 1-261450 | 10/1989 | Japan . |
| 2-120381 | 5/1990 | Japan . |
| 3-131632 | 6/1991 | Japan . |
| 3-188170 | 8/1991 | Japan . |
| 4-146945 | 5/1992 | Japan . |

*Primary Examiner*—Robert E. Sellers
*Attorney, Agent, or Firm*—Sherman and Shalloway

[57] ABSTRACT

A non-aqueous dispersion type coating resin composition which is excellent in pigment dispersibility and adhesive properties to various base material surfaces, can be made to have a high solid content, can be applied thick, and can form coat having good physical properties such as water resistance, alkali resistance and weatherability, and comprises (A) an organic solvent comprising an aliphatic hydrocarbon solvent as a main component, (B) an acrylic polymer which contains therein 0.2 to 30 weight % of a repeating unit represented by the following formula (I)

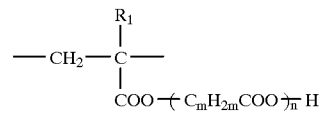

wherein, $R^1$ represents a hydrogen atom or methyl group, m is an integer of 3 to 11, and n is a number of 1 to 10, and is soluble in the above organic solvent (A), and (C) polymer fine particles substantially insoluble in the above organic solvent (A).

17 Claims, No Drawings

COATING RESIN OF ALIPHATIC HC SOLVENT, CARBOXY-FUNCTIONAL ACRYLIC POLYMER AND POLYMER PARTICLES

This is a division of application Ser. No. 08/586,800 filed Jan. 22, 1996 filed May 20, 1994, pending; which is the national stage entry of International Application No. PCT/JP94/00811.

TECHNICAL FIELD

This invention relates to a coating resin composition, and, more specifically, relates to a non-aqueous dispersion type coating resin composition which is excellent in pigment dispersibility and adhesive properties to various base material surfaces, can be made to have a high solid content, can be applied thick, and can form coat having good physical properties such as water resistance, alkali resistance and weatherability.

BACKGROUND ART

Heretofore as coating resin compositions, many organic solvent dissolution type resin compositions have been used because they can form excellent coat. However, in recent years, from the viewpoints of problems of air pollution and environmental hygiene, safety on fire protection in storage and use, etc., resin compositions dissolved or dispersed in nonpolar organic solvents having relatively high flash points represented by optically inactive aliphatic hydrocarbon solvents have drawn attention.

Among them, non-aqueous dispersion type resin compositions wherein insoluble polymer fine particles are dispersed in organic solvents using polymer dispersion stabilizers have come to be used widely for coating of the inside and outside of buildings, structures, etc. because, in comparison with usual organic solvent dissolution type resin compositions, the above resin compositions have characteristics, for example that they are readily made to have high solid contents and it is possible to reduce the use amount of the organic solvents, and they have thixotropic properties which makes thick coating possible.

As such non-aqueous dispersion type resin compositions, there have been proposed, for example, a non-aqueous dispersion type resin wherein a specific vinyl polymer is used as a dispersion stabilizer (Japanese Laid-open Patent Publication No. 220564/1987), an ordinary temperature dryable non-aqueous dispersion type resin wherein the glass transition temperature of the polymer forming the particles is specified (Japanese Laid-open Patent Publication No. 131632/1991), an ordinary temperature dryable non-aqueous dispersion type resin wherein a specific vinyl graft alkyd resin is used as a dispersion stabilizer (Japanese Laid-open Patent Publication No. 261450/1989), etc.

However, non-aqueous dispersion type resin compositions as mentioned above which so far been proposed have problems, for example that they are inadequate in adhesive properties to various base material surfaces; since pigment dispersibility is inadequate, the storage stability of the paint composition is poor and the viscosity thereof increases with time lapse; lowering of the gloss of the coat is observed; and even if adhesive properties are relatively good, it is difficult to meet, at the same time, coat performances such as alkali resistance and weatherability. Therefore, the resin compositions are not fully satisfactory as coating compositions in practical use.

A main object of this invention is to provide a non-aqueous dispersion type coating resin composition wherein the above disadvantages are overcome, namely which is excellent in pigment dispersibility and adhesive properties to various base material surfaces, can be made to have a high solid content, can be applied thick, and can form coat having good physical properties such as water resistance, alkali resistance and weatherability.

DISCLOSURE OF INVENTION

According to the invention is provided a coating resin composition comprising (A) an organic solvent comprising an aliphatic hydrocarbon solvent as a main component, (B) an acrylic polymer which contains therein 0.2 to 30 weight % of a repeating unit represented by the following formula

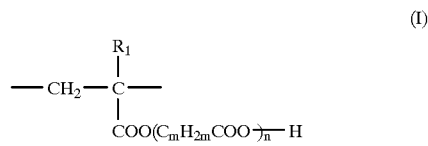

wherein,

R represents a hydrogen atom or methyl group, m is an integer of 3 to 11, and n is an integer of 1 to 10, and is soluble in the above organic solvent (A), and (C) polymer fine particles substantially insoluble in the above organic solvent (A).

The coating resin composition of the invention is further detailedly described below.

Organic solvent (A):

The organic solvent (A) used in the composition of the invention is one comprising a nonpolar aliphatic hydrocarbon solvent as a main component. Herein, the expression "aliphatic hydrocarbon solvent" includes not only straight-chain and branched chain ones, but cyclic ones (i.e., alicyclic ones).

As aliphatic hydrocarbon solvents usable in the invention, there can, for example, be mentioned $C_6$ to $C_{14}$ alkanes such as n-hexane, isohexane, n-heptane, n-octane, isooctane, n-decane and n-dodecane; $C_6$ to $C_{14}$ cycloalkanes such as cyclohexane, methylcyclohexane, cycloheptane and methylcycloheptane; etc.

These aliphatic hydrocarbon solvents can be used alone respectively, or can be used in mixing of 2 or more. As aliphatic hydrocarbon mixed solvents, many ones are put on the market, and there can, for example, mentioned "Laws", "Mineral Spirit EC", "Shellsol 72", "VM & P Naphtha", "Shell TS28 Solvent" (these are manufactured by Shell Chemical Co.; "Isopar C", "Isopar E", "Isopar G", "Isopar H", "Isopar M", "Naphtha No. 3", "Naphtha No. 5", "Naphtha No. 6", "Solvent No. 7" (these are manufactured by Exxon Chemical Co.); "IP Solvent 1016", "IP Solvent 1620", "IP Solvent 2028", "IP Solvent 2835" (these are manufactured by IDEMITSU PETROCHEMICAL CO., LTD.); "Whitesol" (manufactured by Kyodo Oil Co., Ltd.); "Mitsubishi Mineral Turpen", "Diamond Solvent" (these are manufactured by Mitsubishi Oil Co., Ltd.); "Pegasol AN-45", "Pegasol 3040" (these are manufactured by Mobil Oil Co., Ltd.); etc.

As aliphatic hydrocarbon solvents used in the invention, those having a boiling point within about 65 to about 300° C., particularly about 95 to about 220° C. are, generally, preferred in view of safety on fire protection, etc.

The above-mentioned aliphatic hydrocarbon solvents can be mixed when desired and used as such, but, if necessary, for example, for the purpose of heightening the solubility of the later-described acrylic polymer (B), adjusting the viscosity of the final resin composition, etc., it is possible to use together an organic solvent other than aliphatic hydrocarbon ones at a small rate, usually, in an amount 50 weight % or less, preferably 40 weight % or less, more preferably 30 weight % or less based on the total weight of the used organic solvents.

As organic solvent usable together, there can be mentioned aromatic hydrocarbon organic solvents such as, for example, benzene, toluene, ethylbenzene, propyl-benzene, tert-butylbenzene, o-xylene, m-xylene, p-xylene, tetralin, decalin, "Solvesso 100" and "Solvesso 150" (these are manufactured by Exxon Chemical Co.); alcoholic organic solvents such as, for example, methyl alcohol, ethyl alcohol, n-propyl alcohol, iso-propyl alcohol , n-butyl alcohol , iso-butyl alcohol n-hexyl alcohol, n-octyl alcohol, iso-octyl alcohol and 2-ethylhexyl alcohol; ketonic organic solvents such as, for example, acetone, methyl ethyl ketone, methyl iso-butyl ketone, methyl amyl ketone and cyclohexanone; ester organic solvents such as, for example, methyl acetate, ethyl acetate, n-butyl acetate and amyl acetate; cellosolve organic solvents such as, for example, methyl cellosolve, ethyl cellosolve, n-propyl cellosolve, iso-propyl cellosolve, n-butyl cellosolve, iso-butyl cellosolve, iso-amyl cellosolve, phenyl cellosolve and benzyl cellosolve; carbitol organic solvents such as, for example, methylcarbitol, ethylcarbitol , n-propylcarbitol , iso- propyl carbitol n-butylcarbitol, iso-butylcarbitol, iso-amylcarbitol, phenylcarbitol and benzyl-carbitol; etc.

Among these organic solvents, aromatic hydrocarbon organic solvents are particularly preferred.

As organic solvents (A) used in the invention, ones having an aniline point within the range of 10 to 90° C., particularly 15 to 85° C., further particularly 20 to 75° C. are, generally, preferred by the reasons, for example that the resultant coating compositions have good stability, and when resin coats are recoated with the coating compositions, inconveniences such as affecting the resin coats does not easily occur. In this connection, the "aniline point" means the lowest temperature at which equal volumes of aniline and a hydrocarbonic solvent or hydrocarbonic mixed solvent can exist as a uniform solution, and can be determined according to the measurement method described in JIS K 2256.

Further, it is desirable that the organic solvents (A) used in the invention have a solubility parameter SP value, which is an index for indicating the tendency of solubility of substances, within the range of generally 6.8 to 8.6, particularly 7.0 to 8.4, further particularly 7.2 to 8.2. Especially, for preparing a polymer dispersion which has a high solid content and is stable, it is desirable that the solubility parameter of the organic solvent (A) (hereafter, referred to as SPA) satisfies the following relations, among the solubility parameter of the later-described acrylic polymer (B) (hereafter, referred to as $SP_B$) and the solubility parameter of the later-described polymer fine particles (C) (hereafter, referred to as $SP_C$)

① $0.4 \leq SP_B - SP_A \leq 1.4$,
preferably
$0.5 \leq SP_B - SP_A \leq 1.2$,
② $1.2 \leq SP_C - SP_A \leq 3.4$
preferably
$1.2 \leq SP_C \leq SP_A \leq 3.0$ and
③ $SP_C \geq SP_B$ By using an organic solvent (A), an acrylic polymer (B) and polymer fine particles (C) each satisfying the above requisites of the above ① to ③ on SP values, it becomes possible to prepare a coating composition having a solid content of as high as usually 40 to 65 weight %, in some case 65 to 80 weight %.

In this connection, the "solubility parameter SP value" is a value measured or calculated according to the method described in Polymer Handbook, Second Edition, written by H. Burrell, IV-337–IV-359 (1975). The SP value of a mixed solvent was determined by adding up values obtained by multiplying the SP value of each solvent component constituting the mixed solvent by its volume fraction. Further, the SP value of a homopolymer was calculated according to the following SP value calculation equation based on the molecular gravitation constant G of the constitution unit forming the polymer.

$$SP = d\Sigma G/M$$

wherein, d is the density (g/λ) of a homopolymer,
ΣG is the total of molecular gravitation constants in the molecule of the constitution units, and
M is the molecular weight (g/mol) of the constitution unit.

The SP value of a copolymer is one calculated by adding up values obtained by calculating the SP value of each homopolymer of each constitutive unit constituting the copolymer, and multiplying each of those SP values by the molar fraction of each constitution unit.

Acrylic polymer (B):

An acrylic polymer (B) used in the composition of the invention and soluble in the above organic solvent (A) not only plays a role as a dispersion stabilizer for dispersing the later-described polymer fine particles (C) stably in the organic solvent (A), but has actions, for example, of giving adhesive properties to various base material surfaces, heightening pigment dispersibility and dispersion stability and heightening the film forming properties of the polymer fine particles, and contains therein 0.2 to 30 weight % of a repeating unit represented by the following formula

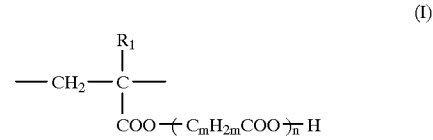

wherein,
R¹ represents a hydrogen atom or methyl group,
m is an integer of 3 to 11, preferably 4 to 7, most preferably 5, and
n represents the average addition mol number of the lactone, and is a number of 1 to 10, preferably 1 to 6, more preferably 1 to 4.

The repeating unit of the above formula (I) has a side chain having large polarity wherein lactone ring(s) is(are) ring-opening added, and moreover, a carboxyl group is positioned at the tip of the long pendant side chain and thus the degree of the freedom of the carboxyl group is large, and therefore, the coating composition of the invention, wherein the acrylic polymer (B) containing such repeating unit is used, is extremely excellent in adhesive properties to substrates and pigment dispersibility. The effect is adequately exerted even if the repeating unit of the above formula (I) is contained in the acrylic polymer (B) only at a rate of as small as e.g. 0.2 to 0.5 weight %, but, usually, it is suitable that the amount of the repeating unit is within the range of 0.2 to 20 weight %, preferably 0.2 to 10 weight %, particularly preferably 0.5 to 5 weight %.

Further, since the repeating unit of the above formula (I) has a carboxyl group at the side chain terminus, it is possible to form crosslinking utilizing a crosslinking agent reacting with the carboxyl group. Therefore, when the composition of the invention is used together with the crosslinking agent for a carboxyl group, for attaining a moderate degree of crosslinking, the repeating unit of the above formula (I) can be made to exist at a content within the range of 0.5 to 30 weight %, preferably 1 to 20 weight %, more preferably 2 to 15 weight %, in accordance with the numbers of m and/or n in the formula (I), etc.

On the other hand, in the case where such a crosslinking agent is not used, since when the content of the repeating unit of the formula (I) is larger, a tendency is seen that the water resistance, alkali resistance, etc. of coat formed using the composition of the invention are lowered, it is desirable to use an acrylic polymer (B) containing the repeating unit of the formula (I) at a relatively small rate as mentioned above.

The acrylic polymer (B) used in the invention can, generally, have a weight average molecular weight within the range of 10,000 to 300,000, preferably 10,000 to 200,000, and it is possible to select the molecular weight freely within the range in accordance with the use form of the final composition, etc. However, as a tentative standard, when the composition of the invention is used as a non-crosslinking system, it is preferred that the acrylic polymer (B) has a weight average molecular weight within the range of usually 30,000 to 200,000, particularly 50,000 to 150,000, and when it is used as a crosslinking system, it is desirable that, in accordance with the type of the crosslinking agent, for example when a chelate compound is used as the crosslinking agent, the acrylic polymer (B) has a weight average molecular weight within the range of usually 20,000 to 200,000, particularly 30,000 to 150,000, and when a crosslinking agent other than a chelate compound is used as the crosslinking agent, the acrylic polymer (B) has a weight average molecular weight within the range of usually 10,000 to 150,000, particularly 10,000 to 50,000.

Weight average molecular weight in this description is a value measured by the gel permeation chromatography (GPC method).

Further, it is preferred in view of physical properties of coat formed, etc. that the acrylic polymer (B) has a glass transition temperature (hereafter, referred to as Tg) within the range of generally 0 to 60° C., preferably 10 to 50° C. Tg in the description is Tg measured in general macromolecules as described in "Dynamic Properties of Macromolecules" written by L. E. Nielsen, translated by Shigeharu Onogi, pages 11 to 35, and, in the case of a copolymer, calculated Tg described in pages 26 to 27 of the book.

Namely, the Tg of a copolymer is one calculated by the following formula.

$$\frac{1}{Tg} = \frac{W_1}{Tg_1} + \frac{W_2}{Tg_2} + \cdots + \frac{W_n}{Tg_n}$$

wherein $W_1+W_2+\ldots W_n=1$ In the above, Tg is the glass transition temperature of the copolymer, and calculated in terms of absolute temperature. $Tg_1, Tg_2 \ldots$ and $Tg_n$ are the glass transition temperatures of pure homopolymers 1, 2 . . . n of component 1, component 2 . . . component n, respectively, and calculated in terms of absolute temperature. $W_1, W_2 \ldots$ and $W_n$ are the weight fractions of the respective components.

The acrylic polymer (B) can further contain, besides ω-carboxyl groups derived from the repeating unit of the above formula (I), crosslinkable functional groups such as, for example, hydroxyl groups, carboxyl groups, amino groups, substituted amino groups (e.g., mono- or di-alkylamino groups), amido groups, substituted amido groups (e.g., mono- or di-alkylamido groups), epoxy groups, mercapto groups, and radical polymerizable unsaturated groups.

The acrylic polymer (B) having such characteristics as mentioned above can, for example, be prepared by using as an indispensable component a monomer represented by the following formula

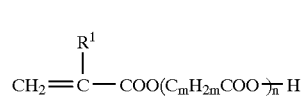
(II)

wherein, $R^1$, m and n are as defined before, and copolymerizing this with another unsaturated monomer copolymerziable therewith.

Other unsaturated monomers copolymerizable with the monomer of the formula (II) include monomers represented by the following formula

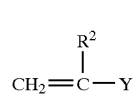
(III)

wherein,
$R^2$ represents a hydrogen atom or methyl group,
Y represents a hydrogen atom, a $C_1$ to $C_2$ alkyl group, a $C_2$ to $C_4$ alkenyl group, a $C_6$ to $C_8$ aryl group, —CN, —COOR$^3$ or —OCOR$^4$ wherein,
$R^3$ represents a $C_1$ to $C_{18}$ alkyl group, $C_6$ to $C_8$ cycloalkyl group or $C_7$ to $C_{12}$ aralkyl group wherein at least part of the hydrogen atoms of these groups can be substituted with fluorine atom(s), and
$R^4$ represents a $C_1$ to $C_{12}$ alkyl group.

As specific examples of monomers of the above formula (III), there can, for example, be mentioned olefins such as ethylene, propylene, 1-butene, iso-butylene, butadiene and isoprene; vinyl aromatic compounds such as styrene, α-methylstyrene, vinyltoluene and ethylvinylbenzene; (meth)acrylonitile; (meth)acrylic esters such as methyl (meth)acrylate, ethyl (meth)acrylate, n-propyl (meth) acrylate, n-butyl (meth)acrylate, isobutyl (meth)acrylate, tert-butyl (meth)acrylate, n-hexyl (meth)acrylate, n-octyl (meth)acrylate, isooctyl (meth)acrylate, 2-ethylhexyl-(meth) acrylate, isononyl (meth)acrylate, n-dodecyl (meth)acrylate, stearyl (meth)acrylate, cyclohexyl (meth)acrylate, methylcyclohexyl (meth)acrylate and benzyl (meth)acrylate; fluorine-containing (meth)acrylic esters such as "Viscoat 8F", "Viscoat 8FM" and "Viscoat 3FM" (these are trade marks and manufactured by Osaka Yuki Kagaku Kogyo Co. Ltd.); saturated fatty acid vinyl esters such as vinyl formate, vinyl acetate, vinyl propionate, vinyl n-butyrate and "Vinyl VERSATATE" (trade mark, manufactured by Shell Chemical Co.); etc.

These monomers can be used alone, but can be used in combination of 2 or more. These monomers can be selected freely in accordance with characteristics needed for final compositions, etc., but, usually, preferred are n-butyl methacrylate, isobutyl methacrylate, n-hexyl methacrylate, n-octyl methacrylate, isooctyl methacrylate, 2-ethylhexyl (meth)acrylate, n-dodecyl (meth)acrylate, cyclohexyl (meth)acrylate, styrene and vinyltoluene.

The monomer of the above formula (II) can be prepared, for example, by adding to (meth)acrylic acid a lactone represented by the formula

(IV)

wherein, m is as defined before.

In the copolymerization, the monomer of the formula (II) can be used in an amount corresponding to the content of the repeating unit of the formula (I) desired for the acrylic polymer (A), and the residual can be the monomer of the formula (III). At that time, when needed, it is possible to replace part of the monomer of the formula (III) by an unsaturated monomer containing at least one crosslinkable functional group as mentioned before in one molecule (hereafter, referred to as functional monomer).

As usable functional monomers, there can, for example, be exemplified carboxyl group-containing monomers such as acrylic acid, methacrylic acid, itaconic acid, maleic acid, maleic anhydride, fumaric acid, crotonic acid and citraconic acid, preferably acrylic acid and methacrylic acid; amido group- or substituted amido group-containing monomers such as acrylamide, methacrylamide, N,N-dimethylacrylamide, N-methylacryl-amide and N-n-butoxymethylacrylamide, preferably acrylamide and methacrylamide; hydroxy group-containing monomers such as 2-hydroxyethyl acrylate, 2-hydroxy-propyl acrylate, 2-hydroxyethyl methacrylate, 2-hydroxy-propyl methacrylate, allyl alcohol and methallyl alcohol, preferably hydroxy lower alkyl (meth)acrylates such as 2-hydroxyethyl acrylate, 2-hydroxypropyl acrylate, 2-hydroxyethyl methacrylate and 2-hydroxypropyl methacrylate; amino group- or substituted amino group-containing monomers such as aminoethyl acrylate, N,N-dimethylaminoethyl acrylate, N,N-diethylaminoethyl acrylate, N,N-dimethylaminoethyl methacrylate and N,N-diethylaminoethyl methacrylate, preferably N,N-di-lower alkylamino-lower alkyl (meth)acrylates such as N,N-dimethylaminoethyl acrylate and N,N-diethylamino-ethyl methacrylate; epoxy group-containing monomers such as glycidyl methacrylate, glycidyl acrylate, glycidyl allyl ether, glycidyl methallyl ether and glycidyl vinyl ether; mercapto group-containing monomers such as vinylmercaptan and allylmercaptan; monomers having 2 or more radical polymerizable unsaturated groups in one molecule such as (poly)ethylene glycol di(meth)acrylate, neopentyl glycol di(meth)acrylate, trimethylolpropane tri(meth)acrylate, allyl (meth)acrylate, triallyl cyanurate, triallyl isocyanurate, diallyl phthalate and divinylbenzene; etc.

Among these functional monomers, preferred are carboxyl group-containing monomers, amido group-containing monomers, hydroxyl group-containing monomers and substituted amino group-containing monomers, especially, (meth)acrylic acid, (meth)acrylamide, hydroxy lower alkyl (meth)acrylates and N,N-di-lower alkylamino-lower alkyl (meth)acrylates.

In the description, the term "lower" means that the carbon number of a group or compound which this term is attached to is 6 or less, preferably 4 or less.

The above functional monomer can be used within the range of generally 0 to 20 weight %, preferably 0 to 15 weight %, more preferably 0 to 10 weight % based on the total amount of the monomer used in copolymerization.

Copolymerization of the above-mentioned monomers can be conducted according to a polymerization method known per se, for example a method such as solution polymerization, emulsion polymerization or photopolymerization. Specifically, the copolymerization can be conducted, for example, by copolymerizing a monomer of the above formula (II), monomer(s) of the above formula (III) and, when used, a functional monomer in an aforementioned organic solvent (A), in the presence of a suitable polymerization initiator and, if necessary, a chain transfer agent, if necessary in an atmosphere of an inert gas. In this occasion, it is possible to add successively at least part of the organic solvent, the monomers, the polymerization initiator and/or the chain transfer agent.

As polymerization initiators, there can, for example, be used organic peroxides such as benzoyl peroxide, lauroyl peroxide, caproyl peroxide, di-tert-butyl peroxide, di-isopropyl peroxydicarbonate, di-2-ethylhexyl peroxydicarbonate, tert-butyl peroxypivalate, cumene hydroperoxide and tert-butyl hydroperoxide; azo compounds such as 2,2'-azobis-iso-butyronitrile, 2,2'-azobis-2,4-dimethylvaleronitrile and 2,2'-azobis-4-methoxy-2,4-dimethylvaleronitrile; etc., alone or in combination, respectively. The use amount of the polymerization initiator can be within the range of generally about 0.01 to about 5 weight parts, preferably about 0.02 to about 2 weight parts per 100 weight parts of the total of monomers used in copolymerization.

As chain transfer agents, there can, for example, be mentioned cyanoacetic acid; cyanoacetic acid alkyl esters wherein the carbon number of the alkyl group is 1 to 8; bromoacetic acid; bromoacetic acid esters wherein the carbon number of the alkyl group is 1 to 8; aromatic compounds such as anthracene, phenanthrene, fluorene and 9-phenylfluorene; aromatic nitro compounds such as p-nitroaniline, nitrobenzene, dinitrobenzene, p-nitrobenzoic acid, p-nitrophenol and p-nitrotoluene; benzoquinone derivatives such as benzoquinone and 2,3,5,6-tetramethyl-p-benzoquinone; borane derivatives such as tributylborane; halogenated hydrocarbons such as carbon tetrabromide, carbon tetrachloride, 1,1,2,2-tetrabromoethane, tribromoethylene, trichloroethylene, bromotrichloromethane, tribromomethane and 3-chloro-1-propene; aldehydes such as chloral and furaldehyde; alkylmercaptans having 1 to 18 carbon atoms; aromatic mercaptans such as thiophenol and toluenemercaptan; mercaptoacetic acid; $C_1$ to $C_{10}$ alkyl esters of mercaptoacetic acid; hydroxyalkylmercaptans having 1 to 12 carbon atoms; terpenes such as pinene and turpinolene; etc. When the chain transfer agent is used, it is preferred that the use amount is within the range of about 0.005 to about 3 weight parts per 100 weight parts of the total of monomers used in copolymerization.

The above copolymerization can be conducted at temperatures of usually about 30 to about 180° C., preferably about 60 to about 150° C.

Polymer fine particles (C)

In the non-aqueous dispersion type coating resin composition of the invention, polymer fine particles stably dispersed in the afore-mentioned organic solvent (A) by the acrylic polymer (B) are used for purposes of control of the viscosity of the composition, acceleration of drying or curing of coat formed using the composition, thick coating, prevention of sagging, heightening of solid content, etc. The kind of the polymer fine particles (C) is not strictly limited so long as they are substantially insoluble in the organic solvent (A), and they can be those wherein intramolecular crosslinking occurred (so-called microgel) or can be in the form of particles substantially not crosslinked, but, generally, non-aqueous dispersion type emulsions are preferred.

In this connection, "substantially insoluble in the organic solvent (A)" means such a state that, even if the polymer fine particles (C) are swelled by the organic solvent (A), they maintain the shape of particles, and the boundary surfaces between the organic solvent and the particles are recognized. This state can be confirmed under a microscope or by the light scattering method.

The polymer fine particles (C) used in the invention can have an average particle size within the range of generally about 0.05 to about 5 μm, preferably about 0.1 to about 2 μm, although it depends on uses of the composition of the invention, etc.

Further, when the ordinary temperature film forming properties of the composition of the invention and the tackiness of coat formed, etc. are taken into account, it is desirable that the polymer fine particles (C) have a glass transition temperature within the range of generally −10 to 50° C., particularly 0 to 40° C. further particularly 5 to 35° C.

Although it is possible to disperse the polymer fine particles (C) after previous preparation are dispersed in the organic solvent (A) containing the acrylic polymer (B), or they are dispersed in the organic solvent (A) and then the acrylic polymer (B) is added and dissolved, it is, usually, convenient that the polymer fine particles (C) are prepared by (co)polymerizing one or two or more monomers for constituting the polymer fine particles (C), in the organic solvent (A) wherein the acrylic polymer (B) is dissolved, for example, in the organic solvent (A) dissolving and containing the acrylic polymer (B) obtained by forming the acrylic polymer (B) in the organic solvent (A) as mentioned above.

In this occasion, as to the quantitative relation between the acrylic polymer (B) and the polymer fine particles (C), it is desirable that, in the total amount 100 weight % of the acrylic polymer (B) and the polymer fine particles (C), the acrylic polymer (B) is 10 to 70 weight %, preferably 15 to 65 weight %, particularly preferably 20 to 60 weight %, and the polymer fine particles (C) is 30 to 90 weight %, preferably 35 to 85 weight %, particularly preferably 40 to 80 weight As monomers for preparing the polymer fine particles (C), it is possible to use, for example, one or two or more selected from the monomer(s) of the formula (II), the monomers of the formula (III) and functional monomer(s), described in preparation of the acrylic polymer (B), as preferred ones, likewise in the case of the acrylic polymer (B).

Particularly, the polymer fine particles (C) can contain crosslinkable functional groups, and, therefore, can be formed generally by copolymerization of at least one functional group-containing monomer selected from the monomer(s) of the formula (II) and functional monomer(s) with at least one monomer selected from the monomers of the formula (III).

The above functional group-containing monomer can be used within the range of generally 50 weight % or less, preferably 0.1 to 30 weight %, more preferably 0.5 to 25 weight %, most preferably 1 to 20 weight %, based on the total amount of monomers for constituting the polymer fine particles (C). When a polyisocyanate compound is used as the crosslinking agent, a hydroxyl group-containing monomer is particularly preferred among functional group-containing monomers, and the hydroxyl group-containing monomer can be use within the range of generally 1 to 30 weight %, preferably 5 to 25 weight %, more preferably 10 to 20 weight %, based on the total amount of monomers for constituting the polymer fine particles (C).

Further, when a chelate compound is used as the crosslinking agent, it is suitable to use a monomer represented by the above formula (II) within the range of generally 0.1 to 20 weight %, preferably 0.5 to 15 weight %, more preferably 1 to 10 weight %, based on the total amount of monomers for constituting the polymer fine particles (C).

The monomer of the above formula (III) usable together with the above functional group-containing monomer can be selected suitably from the aforesaid examples, but, usually, styrene, (meth)acrylonitrile, methyl (meth)acrylate, ethyl (meth)acrylate, n-propyl (meth)acrylate, n-butyl (meth) acrylate, isobutyl (meth)acrylate, tert-butyl (meth)acrylate, vinyl acetate and vinyl propionate are particularly preferably used. In order to make the polymer fine particles (C) insoluble in the aforesaid organic solvent (A), it is desirable to select one or two or more of the above monomers so as to satisfy $$SP_C - SP_A \geq 1.2$$

(Co)polymers of the above-mentioned monomers can be obtained in the same manner as described about copolymerization of the acrylic polymer (B).

Thereby, a non-aqueous dispersion type emulsion is obtained wherein the polymer fine particles (C) are stably dispersed in the organic solvent (A) in the presence of the acrylic polymer (B).

Coating composition

The coating composition of the invention comprising the organic solvent (A), the acrylic polymer (B) and the polymer fine particles (C) as described before can be used widely in the fields of paint, adhesives, sealing agents, caulking agents, etc. The compounding rate of the before components can be varied in accordance with uses, etc., but, generally, it is suitable to make compounding within the following range based on the total amount of the above three components (A), (B) and (C).

Organic solvent (A) : 20 to 70 weight %, preferably 20 to 60 weight %, more preferably 25 to 55 weight %;

Acrylic polymer (B) : 3 to 56 weight %, preferably 6 to 52 weight %, more preferably 9 to 45 weight %;

Polymer fine particles (C) : 9 to 72 weight %, preferably 14 to 68 weight %, more preferably 18 to 60 weight %

It is possible to compound, if necessary, a crosslinking agent into the composition of the invention. When there is a possibility that the crosslinking agent reacts with the acrylic polymer (B) and/or the polymer fine particles (C) early at ordinary temperature, it is desirable to make the system a two-liquid type (two-package type) and make compounding at the time of use. As usable crosslinking agents, there can, for example, be mentioned amino resins, polyisocyanate compounds, polyepoxy compounds, metal chelate compounds, etc.

As amino resins, alkylated methylolmelamines generally used for paint can be used particularly preferably. Preferred among them are those wherein the number of methylolation is within the range of 4 to 6 and the degree of alkylation is within the range of 3 to 6. As the alkyl group, there can be mentioned ones having 1 to 8 carbon atoms such as methyl, ethyl, propyl, butyl, amyl, hexyl and octyl, but, among them, ones having 1 to 4 carbon atoms are preferred.

As polyisocyanate compounds, there can, for example, be mentioned aromatic diisocyanate compounds such as m- or p-phenylene diisocyanate, 2,4- or 2,6-tolylene diisocyanate, m- or p-xylylene diisocyanate and 4,4'-diphenylmethane diisocyanate; aliphatic or alicyclic diisocyanate compounds such as hexamethylene diisocyanate (hereafter, sometimes abbreviated as HMDI), isophorone diisocyanate, hydrogenated products of the above aromatic diisocyanate compounds and dimeric acid diisocyanates; dimers or trimers of these isocyanate compounds; adducts of these isocyanate compounds to, for example, water or dihydric or trihydric polyols such as ethylene glycol or trimethylolpropane; blocked polyisocyanates wherein the polyisocyanato groups are blocked; etc. Among these polyisocyanate compounds, hydrogenated products of tolylene diisocyanate, hexamethylene diisocyanate, hydrogenated products of hexamethylene diisocyanate or xylene diisocyanate, dimers or trimers of these isocyanate compounds, and adducts of these isocyanate compounds to water or dihydric or trihydric polyols are particularly preferred in view of good weatherability.

Further, as polyepoxy compounds, there can be mentioned bisphenol type epoxy compounds, novolak phenol type epoxy compounds, polyphenol type epoxy compounds, aliphatic type epoxy compounds, alicyclic type epoxy compounds, etc., and liquid bisphenol type epoxy compounds and alicyclic type epoxy compounds are preferred.

Further, when the acrylic polymer (B) and/or polymer fine particles (C) contain epoxy groups as the functional groups, it is also possible to use, as a crosslinking agent, a compound containing two or more carboxyl groups or amino groups such as, for example, adipic acid or hexamethylenediamine.

The use amount of these crosslinking agents is not strictly limited, and can be varied appropriately in accordance with objects, etc., but, generally, such a crosslinking agent can be used in such a rate that the total equivalent number of the crosslinkable functional groups in the crosslinking agent becomes 0.5 to 2 times, particularly 0.75 to 1.5 times the total equivalent number of the crosslinkable functional groups contained in the acrylic polymer (B) and the polymer fine particles (C).

When the above amino resins, polyisocyanate compounds or polyepoxy compounds are used as crosslinking agents, it is possible to compound these crosslinking agents beforehand into the composition of the invention, but since there is a possibility that crosslinking reaction progresses gradually with the lapse of time, it is, generally, preferred to make mixing immediately before use.

Further, when an amino resin or a polyepoxy compound is used as a crosslinking agent, for progressing crosslinking reaction sufficiently, it is, usually, desirable to make heating to temperatures of about 80 to about 200° C., preferably about 100 to ;about 180° C., and, therefore, the composition of the invention wherein an amino resin or a polyepoxy compound is compounded is practically used as a baking type paint. On the other hand, when a polyisocyanate compound is used as a crosslinking agent, crosslinking reaction progresses swiftly usually even at ordinary temperature, and, therefore, the composition of the invention wherein a polyisocyanate compound is compounded is practically used suitably as a ordinary temperature curing type paint.

As crosslinking agents compoundable into the composition of the invention, besides those stated above, metal chelate compounds can also be used. Metal chelate compounds progress remarkably crosslinking reaction with the ω-carboxyl group-containing side chain in the repeating unit of the aforesaid formula (I), and, therefore, by using a metal chelate compound as a crosslinking agent in the composition of the invention, further excellent coat can be formed.

As metal chelate compounds usable in the invention, there can be exemplified as preferred ones aluminum chelate compounds, titanium chelate compounds and zirconium chelate compounds. Among these chelate compounds, chelate compounds containing, as a ligand forming a stable chelate ring, a compound capable of constituting a keto-enol tautomer (hereafter, referred to as keto-enol tautomer type compound) are particularly preferred.

As the above keto-enol tautomer type compounds, there can, for example, be used β-diketones (acetylacetone, etc.), malonic esters (ethyl malonate, etc.), ketones having a hydroxyl group at the β-position (diacetone alcohol, etc.), aldehydes having a hydroxyl group at the β-position (salicylaldehyde, etc.), esters having a hydroxyl group at the β-position (methyl salicylate, etc.), etc. Particularly, when acetoacetic esters or β-diketones are used, good results can be obtained.

As the aluminum chelate compounds, there can be mentioned one prepared by mixing a keto-enol tautomer type compound as mentioned above with an aluminum alcoholate represented by the general formula

(V)

wherein,
$R^5$ represents a $C_1$ to $C_{20}$ alkyl group or a $C_2$ to $C_{20}$ alkenyl group,
at the rate of usually 3 mols or less of the former to 1 mol of the latter, and, if necessary, heating the mixture.

Herein, as the $C_1$ to $C_{20}$ alkyl group, there can be mentioned straight-chain or branched alkyl groups such as, for example, methyl, ethyl, n-propyl, isopropyl, n-butyl, isobutyl, sec-butyl, tert-butyl, n-pentyl, isopentyl, neopentyl, n-hexyl, iso-hexyl, n-heptyl, iso-heptyl, 1-methylpentyl, 2-methylhexyl, n-octyl, n-nonyl, n-decyl, undecyl, dodecyl, tridecyl, tetradecyl and octadecyl groups, and as the $C_2$ to $C_{20}$ alkenyl group, there can, for example, be mentioned vinyl, allyl, etc.

As aluminum alcoholates of the above formula (V), there can, for example, be mentioned aluminum trimethoxide, aluminum triethoxide, aluminum tri-n-propoxide, aluminum tri-isopropoxide, aluminum tri-n-butoxide, aluminum tri-isobutoxide, aluminum tri-sec-butoxide, aluminum tri-tert-butoxide, etc., and particularly preferred are aluminum tri-sec-butoxide, aluminum tri-n-butoxide, etc.

Further, as the titanium chelate compounds, there can be mentioned one prepared by mixing a keto-enol tautomer type compound as mentioned above with a titanate compound represented by the general formula

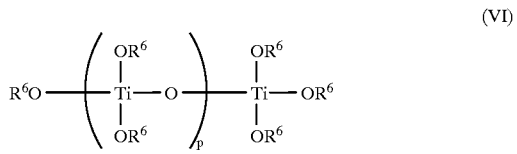

(VI)

wherein,
$R^6$ represents a $C_1$ to $C_{20}$ alkyl group or a $C_2$ to $C_{20}$ alkenyl group, and
p is an integer of 0 to 10,
at the rate of usually 4 mols or less of the former to 1 mol of titanium in the latter, and if necessary, heating the mixture. Herein, in the titanate compounds of the above formula (VI), as those wherein p is 0, there can, for example, be mentioned tetramethyl titanate, tetraethyl titanate, tetra-n- propyl titanate, tetraisopropyl titanate, tetra-n-butyl titanate, tetraisobutyl titanate, tetra- tert-butyl titanate, tetra-n-pentyl titanate, tetra-n- hexyl titanate, tetraisooctyl titanate, tetra-n-lauryl titanate, etc., and particularly preferred are tetra-isopropyl titanate, tetra-n-butyl titanate, tetraisobutyl titanate, tetra-tert-butyl titanate, etc. Further, as those wherein q is 1 or more, dimers to undecamers (p=1 to 10 in the formula (VI)) of , for example, tetra-isopropyl titanate, tetra-n-butyl titanate, tetraisobutyl titanate and tetra-tert-butyl titanate give good results.

Further, as the zirconium chelate compounds, there can be mentioned one prepared by mixing a keto-enol tautomer type compound as mentioned above with a zirconate compound represented by the general formula

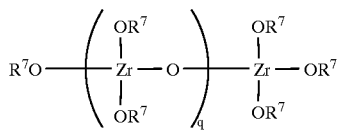

(VII)

wherein,
  $R^7$ represents a $C_1$ to $C_{20}$ alkyl group or a $C_2$ to $C_{20}$ alkenyl group, and
  q is an integer of 0 to 10,
at the rate of usually 4 mols or less of the former to 1 mol of zirconium in the latter, and if necessary, heating the mixture. Herein, in the zirconate compounds of the above formula (VII), as those wherein q is 0, there can, for example, be mentioned tetraethyl zirconate, tetra-n- propyl zirconate, tetraisopropyl zirconate, tetra-n- butyl zirconate, tetra-sec-butyl zirconate, tetra- tert-butyl zirconate, tetra-n-pentyl zirconia, tetra- tert-pentyl zirconate, tetra-tert-hexyl zirconate, tetra-n-heptyl zirconate,tetra-n-octyl zirconate, tetra-n-stearyl zirconate, etc., and particularly preferred are tetraisopropyl zirconate, tetra-n-propyl zirconate, tetraisobutyl zirconate, tetra-n-butyl zirconate, tetra-sec-butyl zirconate, tetra-tert-butyl zirconate, etc. Further, as those wherein q is 1 or more, dimers to undecamers (r=1 to 10 in the formula (VII)) of, for example, tetraisopropyl zirconate, tetra-n-propyl zirconate, tetra-n-butyl zirconate, tetraisobutyl zirconate, tetra-sec-butyl zirconate and tetra-tert-butyl zirconate give good results. Further, the zirconium chelate compound can contain a constitutive unit wherein these zirconate compounds themselves are associated.

Thus, as chelate compounds particularly preferred as the crosslinking agents, there can be mentioned aluminum chelate compounds such as diisopropylate ethyl acetoacetate aluminum, tris(ethyl acetoacetate) aluminum, tris(n-propyl acetoacetate) aluminum, tris(isopropyl acetoacetate) aluminum, tris(n-butyl acetoacetate) aluminum, isopropoxy bisethyl acetoacetate aluminum, diisopropoxy ethyl acetoacetate aluminum, tris(acetyl acetonate) aluminum, tris(ethyl acetonate) aluminum, diisopropylate ethyl acetonate aluminum, monoacetylacetonate bis(ethyl acetonate) aluminum, monoethyl acetoacetate bis(acetylacetonate) aluminum, tris(isopropylate) aluminum, tris(sec-butylate) aluminum, diisopropylate mono-sec-butoxy aluminum and tris(acetylacetone) aluminum; titanium chelate compounds such as diisopropoxy bis(ethyl acetoacetate) titanate, diisopropoxy bis(acetylacetate) titanate and diisopropoxy bis(acetylacetone) titanate; and zirconium chelate compounds such as tetrakis(acetylacetone) zirconium, tetrakis(n-propyl acetoacetate) zirconium, tetrakis(acetylacetonate) zirconium and tetrakis(ethyl acetoacetate) zirconium.

The use amount of these chelate compounds is not strictly limited, but is preferably within the range of, usually, 0.1 to 3 equivalents, particularly 0.2 to 2 equivalents, based on 1 equivalent of carboxyl groups existing in the acrylic polymer (B) and the polymer fine particles (C), especially the ω-carboxyl groups of the side chains in the repeating units of the above formula (I).

Further, when needed, for example inorganic or organic color pigments such as titanium oxide, zinc oxide, carbon black, red iron oxide, Hansa Yellow, Phthalocyanine Blue and Quinacridone Red; inorganic fillers such as calcium carbonate, silica, alumina, kaolin, clay, talc, diatom earth, mica, aluminum hydroxide, barium sulfate, magnesium carbonate and glass powder; scaly metallic powders of aluminum, copper, mica-like iron oxide, bronze, stainless steel, etc.; can be added to and mixed with the composition of the invention.

Further, when needed, age resisters, antiseptics, fungicides, ultraviolet absorbers, antistatic agents, plasticizers, antifoaming agents, leveling agents, pigment-wetting agents, dispersants , segregation inhibitors, thickeners, anti-settling agents, anti-sagging agents, etc. can appropriately be added to and mixed with the composition of the invention.

When the above color pigments and inorganic fillers are added and mixed, they can directly be dispersed in and mixed with coating resin composition of the invention, or they can be dispersed beforehand in the solution of the acrylic polymer (B) and then added and mixed.

Further, it is possible to compound, if necessary, other resins for paint such as alkyd resins or acrylic-modified alkyd resins into the composition of the invention.

When the composition of the invention is used as a coating agent, the composition can be diluted, if necessary, with a suitable organic solvent, and, then, applied onto various base materials, according to a method such as dipping, spraying, painting (e.g., painting by brushes, rollers, roll coaters, knife coaters, etc.) or printing.

As base materials to which the composition of the invention can be applied suitably, there can, for example, be mentioned inorganic base materials such as mortar, concrete, glass, ceramics, slate plates, stones and rocks, calcium silicate plates and ores; newly formed or existing various coat surfaces such as spraying tile coat, automobile topcoat coat, alkyd resin rust proofing coat and epoxy resin rust proofing coat; metal base materials used particularly in the external walls, roofs, etc. of buildings or structures, for example galvanized sheet iron and colored galvanized sheet iron, etc.; etc. In addition, coating agents wherein the composition of the invention is used as a vehicle can also be applied suitably onto base materials, for example, metal plates such as aluminum plates, zinc plates, iron plates and stainless steel plates; moldings of thermoplastic synthetic resins such as vinyl chloride resins, vinylidene chloride resins, vinyl acetate resins, styrene resins, acrylic resins, polyester resins, polyester resins, polycarbonate resins, ABS resins, AS resins, urethane resins and SBR; moldings of thermosetting synthetic resins such as, for example, phenol resins, melamine resins, urea resins, epoxy resins, unsaturated polyester resins and polyimide resins; etc.

EXAMPLES

The invention is further specifically described below according to examples, comparative examples and reference examples, but the invention is not limited by these examples.

15

Preparation of polymer (B) solution

Reference Example 1

50 weight parts of a hydrocarbon organic solvent on the market "Laws" (an organic solvent mainly comprising aliphatic hydrocarbons, boiling point about 155 to 196° C., aniline point 44.5° C., solubility parameter 7.8; manufactured by Shell Chemical Co.) was put in a reaction vessel equipped with a thermometer, a stirrer and a reflux condenser, etc. In another vessel was prepared 600 weight parts of a monomer mixture consisting of 35 weight % of isobutyl methacrylate (iBMA), 15 weight % of n-butyl methacrylate (nBMA), 19 weight % of 2-ethylhexyl acrylate (EHA) and 30 weight % of styrene (St) as the monomers (b), and 1 weight % of ω-carboxy-polycaprolactone monoacrylate (average of n 2, CPCA) as the monomer (a), and 300 weight parts of the mixture was put in the reaction vessel. The gaseous portion of the reaction vessel was replaced with nitrogen gas, the mixture was heated to 100° C., 0.2 weight part of t-butyl peroxy-2-ethylhexanoate (tBPOO) as a polymerization initiator was added, and the mixture was held at that temperature for 30 minutes. Then, a mixture consisting of 300 weight parts of the residual monomer mixture, 50 weight parts of the organic solvent "Laws" and 1 weight part of the polymerization initiator tBPOO was successively added at a constant rate over a period of 2 hours. After completion of the addition, the mixture was held at that temperature for 30 minutes, 3 weight parts of the polymerization initiator tBPOO was added, the mixture was held at that temperature for further 3 hours, 500 weight parts of the organic solvent "Laws" was added, and the mixture was cooled to give a solution of the polymer (B).

The kind, initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in the obtained polymer solution, the solubility parameter $SP_B$, acid value, Tg and $M_W$ of the polymer (B) therein, and the solid content and viscosity of the polymer solution were shown in Table 2.

Reference Example 2

A polymer (B) solution was obtained in the same manner as in Reference example 1 except that, in Reference example 1, polymerization was conducted using a hydrocarbonic organic solvent "Isopar G" (an organic solvent mainly comprising aliphatic hydrocarbons, boiling point about 155 to 175° C., aniline point 80° C. solubility parameter 7.2; manufactured by Exxon Chemical Co.) instead of using the organic solvent "Laws", using, as monomers, 50 weight % of iBMA and 49 weight % of 2-ethylhexyl methacrylate (EHMA), and 1 weight % of CPCA as the monomer (a) instead of using 35 weight % of iBMA, 15 weight % of nBMA, 19 weight % of EHA and 30 weight % of St, and 1 weight % of CPCA as the monomer (a), changing the rate between the initial addition amount and the successive addition amount, and changing the rate among the initial addition amount, successive addition amount and later addition amount of the polymerization initiator. The kind, initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in the obtained polymer solution, the solubility parameter $SF_B$, acid value, Tg and Mw of the polymer (B) therein, and the solid content and viscosity of the polymer solution were shown in Table 2.

Reference Example 3

A polymer (B) solution was obtained in the same manner as in Reference example 1 except that, in Reference example 1, polymerization was conducted changing the rate among the initial addition amount, successive addition amount and later addition amount of the organic solvent "Laws", changing the composition of the monomers and the rate between the initial addition amount and successive addition amount of the monomers, and changing the rate among the initial addition amount, successive addition amount and later addition amount of the polymerization initiator. The kind, initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in the obtained polymer solution, the solubility parameter $SP_B$, acid value, Tg and $M_W$ of the polymer (B) therein, and the solid content and viscosity of the polymer solution were shown in Table 2.

Reference Examples 4 to 6

Polymer (B) solutions were obtained in the same manner as in Reference example 3 except that, in Reference example 3, polymerization was conducted changing the composition of the monomers. The initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in each polymer solution obtained, the solubility parameter $SP_B$, acid value, Tg and $M_W$ of the polymer (B) therein, and the solid content and viscosity of each polymer solution were shown in Table 2.

Reference Example 7

A polymer (B) solution was obtained in the same manner as in Reference example 3 except that, in Reference example 3, polymerization was conducted changing the later addition amount of the organic solvent "Laws", changing the composition of the monomers, and changing the initial addition amount and Successive addition amount of the polymerization initiator. The kind, initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in the obtained polymer solution, the solubility parameter $SP_B$, acid value, Tg and $M_W$ of the polymer (B) therein, and the solid content and viscosity of the polymer solution were shown in Table 2.

Reference Example 8

A polymer (B) solution was obtained in the same manner as in Reference example 3 except that, in Reference example 3, polymerization was conducted using a hydrocarbonic organic solvent "VM & P Naphtha" (an organic solvent mainly comprising aliphatic hydrocarbons, boiling point about 120 to 150° C., aniline point 56° C., solubility parameter 7.6; manufactured by Shell Chemical Co.) instead of using the organic solvent "Laws". The kind, initial addition amount, successive addition amount and later addition amount of the organic solvent used, the composition initial addition amount and successive addition amount of the monomers, and the initial addition amount, successive addition amount and later addition amount of the polymerization initiator were shown in Table 1. The solubility parameter SP value of the organic solvent in the obtained polymer solution, the solubility parameter $SP_B$, acid value, Tg and $M_W$ of the polymer (B) therein, and the solid content and viscosity of the polymer solution were shown in Table 2.

Reference Example 9

A polymer (B) solution was obtained in the same manner as in Reference example 1 except that, in Reference example 1, polymerization was conducted changing the composition of the monomers. The initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in the obtained polymer solution, the solubility parameter $SP_B$, acid value, Tg and $M_W$ of the polymer (B) therein, and the solid content and viscosity of the polymer solution were shown in Table 2.

Reference Examples 10 to 11

Polymer (B) solutions were obtained in the same manner as in Reference example 1 except that, in Reference example 1, polymerization was conducted changing the composition of the monomers and the rate between the initial addition and successive addition of the monomers, and changing the rate among the initial addition amount, successive addition amount and later addition amount of the polymerization initiator. The kind, initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in each polymer solution obtained, the solubility parameter $SP_B$, acid value, Tg and $M_W$ of the polymer (B) therein, and the solid content and viscosity of each polymer solution were shown in Table 2.

Reference Example 12

A polymer (B) solution was obtained in the same manner as in Reference example 1 except that, in Reference example 1, polymerization was conducted using a hydrocarbonic organic solvent "Solvesso 100" (an organic solvent mainly comprising aromatic hydrocarbons, boiling point about 160 to 180° C., aniline point 0° C. or less, solubility parameter 8.6; manufactured by Exxon Chemical Co.) instead of using the organic solvent "Laws", changing the composition of the monomers and the rate between the initial addition and successive addition of the monomers, and chainging the rate among the initial addition amount, successive addition amount and later addition amount of the polymerization initiator. The kind, initial addition amount, successive addition amount and later addition amount of the organic solvent used, the composition, initial addition amount and successive addition amount of the monomers, and the initial addition amount, successive addition amount and later addition amount of the polymerization initiator were shown in Table 1. The solubility parameter SP value of the organic solvent in the obtained polymer solution, the solubility parameter $SP_B$, acid value, Tg and Mw of the polymer (B) therein, and the solid content and viscosity of the polymer solution were shown in Table 2.

Symbols in the monomer composition in Table 1 represent the following monomers, respectively.

Monomer (C)

HEMA : 2-Hydroxyethyl methacrylate

AA : Acrylic acid

MAA : Methacrylic acid

TABLE 1

| | | Organic solvent | | | Monomer composition (weight %) | | | | | | | | |
|---|---|---|---|---|---|---|---|---|---|---|---|---|---|
| | | Use amount (weight part) | | | (a) | (b) | | | | | (c) | | |
| Experiment No. | Kind | Initial | Successive | Later | CPCA | nBMA | iBMA | EHMA | EHA | St | HEMA | AA | MAA |
| Reference example 1 | Laws | 50 | 50 | 500 | 1 | 15 | 35 | | 19 | 30 | | | |
| Reference example 2 | Isopar | 50 | 50 | 500 | 1 | | 50 | 49 | | | | | |
| Reference example 3 | Laws | 200 | 50 | 350 | 3 | | 60 | | 7 | 30 | | | |
| Reference example 4 | Laws | 200 | 50 | 350 | 5 | | 53 | | 12 | 30 | | | |
| Reference example 5 | Laws | 200 | 50 | 350 | 10 | | 35 | 15 | 10 | 30 | | | |
| Reference example 6 | Laws | 200 | 50 | 350 | 1 | | 40 | | 24 | 30 | 5 | | |
| Reference example 7 | Laws | 200 | 50 | 150 | 3 | | 25 | 27 | 10 | 30 | 5 | | |
| Reference example 8 | VM & P | 200 | 50 | 350 | 3 | 15 | 35 | | 17 | 30 | | | |
| Reference example 9 | Laws | 50 | 50 | 500 | | 15 | 35 | | 20 | 30 | | | |
| Reference example 10 | Laws | 50 | 50 | 500 | | 15 | 35 | | 18 | 30 | | 2 | |
| Reference example 11 | Laws | 50 | 50 | 500 | | | 50 | 49.14 | | | | | 0.86 |
| Reference example 12 | Solvesso | 50 | 50 | 500 | 1 | | 40 | | 24 | 30 | 5 | | |

TABLE 1-continued

| | Monomer mixture (weight part) | | Polymerization initiator Use amount (weight part) | | |
|---|---|---|---|---|---|
| Experiment No. | Initial | Successive | Initial | Successive | Later |
| Reference example 1 | 300 | 300 | 0.2 | 1 | 3 |
| Reference example 2 | 200 | 400 | 0.6 | 2 | 2 |
| Reference example 3 | 200 | 400 | 1.2 | 6 | 2 |
| Reference example 4 | 200 | 400 | 1.2 | 6 | 2 |
| Reference example 5 | 200 | 400 | 1.2 | 6 | 2 |
| Reference example 6 | 200 | 400 | 1.2 | 6 | 2 |
| Reference example 7 | 200 | 400 | 2.4 | 30 | 2 |
| Reference example 8 | 200 | 400 | 1.2 | 6 | 2 |
| Reference example 9 | 300 | 300 | 0.2 | 1 | 3 |
| Reference example 10 | 200 | 400 | 0.6 | 2 | 2 |
| Reference example 11 | 200 | 400 | 0.6 | 2 | 2 |
| Reference example 12 | 200 | 400 | 1.2 | 6 | 2 |

TABLE 2

| | Organic solvent SP value | SPs | Polymer (B) Acid value | Tg (° C.) | Mw (10,000) | Polymer solution Solid content (weight %) | Viscosity (cps) |
|---|---|---|---|---|---|---|---|
| Experiment No. | | | | | | | |
| Reference example 1 | 7.8 | 8.8 | 1.87 | 18 | 14.5 | 49.7 | 16800 |
| Reference example 2 | 7.2 | 8.6 | 1.87 | 16 | 9.8 | 49.8 | 6800 |
| Reference example 3 | 7.8 | 8.8 | 5.6 | 42 | 5.4 | 50.2 | 2000 |
| Reference example 4 | 7.8 | 8.9 | 9.3 | 31 | 5.0 | 5o.1 | 2700 |
| Reference example 5 | 7.8 | 8.9 | 18.7 | 21 | 5.2 | 50.3 | 3100 |
| Reference example 6 | 7.8 | 9.0 | 1.87 | 14 | 5.1 | 49.9 | 2500 |
| Reference example 7 | 7.8 | 8.8 | 5.6 | 20 | 1.5 | 60.3 | 1300 |
| Reference example 8 | 7.6 | 8.9 | 5.6 | 20 | 5.1 | 50.o | 2400 |
| Reference example 9 | 7.8 | 8.8 | 0 | 18 | 15.0 | 49.8 | 12000 |
| Reference example 10 | 7.8 | 9.0 | 15.6 | 22 | 10.2 | 49.8 | 12600 |
| Reference example 11 | 7.8 | 8.6 | 5.6 | 17 | 9.9 | 50.1 | 8400 |
| Reference example 12 | 8.6 | 9.0 | 1.87 | 14 | 5.0 | 49.7 | 2300 |

Preparation of non-aqueous dispersion type emulsion

Example 1

300 weight parts of the polymer (B) solution obtained in Reference example 1 and 200 weight parts of the organic solvent "Laws" were put in the same reaction vessel as used in Reference example 1, the gaseous portion of the reaction vessel was replaced with nitrogen gas, and the mixture was heated to 100° C. While the mixture was held at that temperature, a mixture consisting of 350 weight parts of a monomer mixture consisting of 20 weight % of methyl methacrylate (MMA), 34 weight % of ethyl acrylate (EA), 20 weight % of n-BMA and 25 weight % of St, and 1 weight % of diethylamino-ethyl methacrylate (DE) as the monomer (c), 150 weight parts of the organic solvent "Laws", and 3.5 weight parts of a polymerization initiator tBPOO was successively added at a constant speed over a period of 2 hours. After completion of the addition, the mixture was held at that temperature for 30 minutes, 3.0 weight parts of tBPOO was added, and the mixture was held at that temperature for further 3 hours to give a non-aqueous dispersion type emulsion. The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non-aqueous emulsion, the value of $SP_B$–$SP_A$, the solubility parameter $SP_C$ and Tg of the polymer (C), the value of $SP_C$–$SP_A$, amount ratio between the polymer (B) and the polymer (C), acid value, and the solid content and viscosity of the non-aqueous emulsion were shown in Table 4.

Example 2

A non-aqueous dispersion type emulsion was obtained in the same manner as in Example 1 except for, in Example 1, using the polymer (B) solution obtained in Reference example 2 instead of using the polymer (B) solution obtained in Reference example 1, using, as an organic solvent for the initial charge, 120 weight parts of the organic solvent "Laws" and 80 weight parts of the organic solvent "Isopar G" instead of using 200 weight parts of the organic solvent "Laws", and changing the monomer composition for the polymer (B). The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, and the solid content and viscosity of the non-aqueous emulsion were shown in Table 4.

Example 3 and Comparative Examples 1 to 3

Polymerization was conducted in the same manner as in Example 1 except for, in Example 1, using the polymer (B) solution obtained in Reference example 2 or one of the polymer solutions obtained in Reference examples 9 to 10 instead of using the polymer (B) solution obtained in Reference example 1, and changing the monomer composition for the polymer (C). As a result, non-aqueous dispersion type emulsions excellent in dispersion stability were obtained in Example 3 and Comparative examples 1 and 3, but, in Comparative example 2, a non-aqueous dispersion type emulsion excellent in dispersion stability was not obtained.

As to each example, the kind of the used polymer (B) solution, the kind, initial charge and successive addition amount of the used organic solvent, the monomer composition for the polymer (C), and the successive addition amount and later addition amount of the polymerization initiator were shown in Table 3. Further, as to each example, the solubility parameter SPA of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, and the solid content and viscosity of the non-aqueous emulsion were shown in Table 4.

Example 4

A non-aqueous dispersion type emulsion was obtained in the same manner as in Example 1 except for, in Example 1, using the polymer (B) solution obtained in Reference example 3 instead of using the polymer (B) solution obtained in Reference example 1, changing, as to the use rate of the organic solvent "Laws", the initial charge from 200 weight parts to 110 weight parts, and changing the monomer composition for the polymer (C). The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, and the solid content and viscosity of the non-aqueous emulsion were shown in Table 4.

Example 5

A resin dispersion was obtained by conducting polymerization in the same manner as in Example 4 except for, in Example 4, reducing the successive addition amount of the organic solvent "Laws" to 107 weight parts. Then, 1.0 weight part of acetylacetone and 8.3 weight parts of 10 weight % of toluene solution of aluminum tris (acetylacetonate) (ATAA) were added to 100 weight parts in terms of the solid components of the resin dispersion, and the mixture was uniformly mixed to give a non-aqueous dispersion type emulsion containing the aluminum chelate compound. The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, the kind and amount of the chelate compound, and the solid content and viscosity of the non-aqueous emulsion were shown in Table 4.

Example 6

A non-aqueous dispersion type emulsion containing an aluminum chelate compound was obtained in the same manner as in Example 5 except that, in Example 5, polymerization was conducted using, as a polymer (B) solution, 360 weight parts of the polymer (B) solution obtained in Reference example 4 instead of using 300 weight parts of the polymer (B) solution obtained in Reference example 3, reducing the successive addition amount of the organic solvent "Laws" to 95 weight parts, and changing the monomer composition for the polymer (C). The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, the kind and amount of the chelate compound, and the solid content and viscosity of the non-aqueous emulsion were shown in Table 4.

Example 7

A non-aqueous dispersion type emulsion containing an aluminum chelate compound was obtained in the same manner as in Example 6 except for, in Example 6, using, as a polymer (B) solution, the polymer (B) solution obtained in Reference example 5 instead of using the polymer (B) solution obtained in Reference example 4, reducing the successive addition amount of the organic solvent "Laws" to 76 weight parts, changing the monomer composition for the polymer (C), and changing the compounding amounts of acetylacetone and ATAA. The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, the kind and amount of the chelate compound, and the solid content and viscosity of the non-aqueous emulsion were shown in Table 4.

Example 8 and Comparative Example 4

Polymerization was conducted in the same manner as in Example 1 except for, in Example 1, using 700 weight parts of the polymer (B) solution obtained in Reference example 6 or the polymer solution obtained in Reference example 12 instead of using 300 weight parts of the polymer (B) solution obtained in Reference example 1, using, as an organic solvent for the initial charge, 83 weight parts of the organic solvent "Laws" or 83 weight parts of the organic solvent "Solvesso 100" instead of using 200 weight parts of the organic solvent "Laws", using, as an organic solvent for the successive addition, 145 weight parts of the organic solvent "Solvesso 100" or a mixed solvent of :30 weight parts of the organic solvent "Solvesso 100" with 115 weight parts of toluene (boiling point about 110° C., aniline point 0° C. or less, solubility parameter 8.9) instead of using 150 weight parts of the organic solvent "Laws", and changing the monomer composition for the polymer (C). As a result, a non-aqueous dispersion type emulsion excellent in dispersion stability was obtained in Example 8, but, in Comparative example 4, dispersion particles were scarcely formed, and a solution type resin solution was obtained.

As to each example, the kind of the used polymer (B) solution, the kind, initial charge and successive addition amount of the used organic solvent, the monomer composition for the polymer (C), and the successive addition amount and later addition amount of the polymerization initiator were shown in Table 3. Further, as to each example, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, and the solid content and viscosity of the non-aqueous emulsion were shown in Table 4.

Example 9

A non-aqueous dispersion type emulsion was obtained in the same manner as in Example 1 except that, in Example 1, polymerization was conducted using 388 weight parts of the polymer (B) solution obtained in Reference example 7 instead of using 300 weight parts of the polymer (B) solution obtained in Reference example 1, changing the initial charge and successive addition amount of the organic solvent "Laws" from 200 weight parts and 150 weight parts to 45 weight parts and 50 weight parts, respectively, and changing the monomer composition for the polymer (C). The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non- aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, and the solid content and viscosity of the non-aqueous emulsion were shown in Table 4.

Example 10

A non-aqueous dispersion type emulsion was obtained in the same manner as in Example 1 except for, in Example 1, using the polymer (B) solution obtained in Reference example 8 instead of using the polymer (B) solution obtained in Reference example 1, using, as an organic solvent for the initial charge, 100 weight parts of the organic solvent "VM & P Naphtha" and 100 weight parts of the organic solvent "Solvesso 100" instead of using 200 weight parts of the organic solvent "Laws", using, as an organic solvent for the successive addition, 150 weight parts of the organic solvent "Solvesso 100" instead of using 150 weight parts of the organic solvent "Laws", and changing the monomer composition for the polymer (C). The obtained emulsion exhibited excellent dispersion stability.

The kind of the used polymer (B) solution, the kind, initial charge and successive addition amount of the used organic solvent, the monomer composition for the polymer (C), and the successive addition amount and later addition amount of the polymerization initiator were shown in Table 3. Further, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, and the solid content and viscosity of the non-aqueous emulsion were shown in Table 4.

Examples 11 to 12

A non-aqueous dispersion type emulsion containing a metal chelate compound was obtained in the same manner as in Example 5 except for, in Example 5, using 8.3 weight parts of 10 weight % toluene solution of diisopropoxy titanium bis(acetylacetonate) (TBAA) or 8.3 weight parts of 10 weight % toluene solution of zirconium tetraacetylacetonate (ZTAA) instead of using 8.3 weight parts of 10 weight % toluene solution of ATAA. The obtained emulsions exhibited excellent dispersion stability.

As to each emulsion, the kind of the used polymer (B) solution, the kind, initial charge and successive addition amount of the used organic solvent, the monomer composition for the polymer (C), and the successive addition amount and later addition amount of the polymerization initiator were shown in Table 3. Further, as to each emulsion, the solubility parameter $SP_A$ of the organic solvent (A) in the obtained non-aqueous emulsion, the value of $SP_B-SP_A$, the solubility parameter $SP_C$ and Tg of the polymer (C), the value of $SP_C-SP_A$, amount ratio between the polymer (B) and the polymer (C), acid value, the kind and amount of the chelate compound, and the solid content and viscosity of the non-aqueous emulsion were shown in Table 4.

Symbols in the monomer compositions in Table 3 (ones other than those described in Table 1) represent the following monomers, respectively.

Monomer (b)

$VA_C$ : Vinyl acetate

TABLE 3

| Experiment No. | Polymer (B) solution Kind | Use amount (weight part) | Organic solvent Kind | Use amount (weight part) Initial | Successive |
|---|---|---|---|---|---|
| Example 1 | Reference example 1 | 300 | Laws | 200 | 150 |
| Example 2 | Reference example 2 | 300 | Laws | 120 | 150 |
|  |  |  | Isopar | 80 | 0 |
| Example 3 | Reference example 2 | 300 | Laws | 200 | 150 |
| Example 4 | Reference example 3 | 300 | Laws | 110 | 150 |
| Example 5 | Reference example 3 | 300 | Laws | 110 | 107 |
| Example 6 | Reference example 4 | 360 | Laws | 110 | 99 |
| Example 7 | Reference example 5 | 360 | Laws | 110 | 76 |
| Example 8 | Reference example 6 | 700 | Laws | 83 | 0 |
|  |  |  | Solvesso | 0 | 145 |
| Example 9 | Reference example 7 | 388 | Laws | 45 | 50 |
| Example 10 | Reference example 8 | 300 | VM & P | 100 | 0 |
|  |  |  | Solvesso | 100 | 150 |
| Example 11 | Reference example 3 | 300 | Laws | 110 | 107 |
| Example 12 | Reference example 3 | 300 | Laws | 110 | 107 |
| Comparative example 1 | Reference example 9 | 300 | Laws | 200 | 75 |
| Comparative example 2 | Reference example 10 | 300 | Laws | 200 | 75 |
| Comparative example 3 | Reference example 11 | 300 | Laws | 200 | 75 |
| Comparative example 4 | Reference example 12 | 700 | Solvesso | 83 | 30 |
|  |  |  | Toluene | 0 | 115 |

| Experiment No. | Monomer composition (weight %) (a) CPCA | (b) MMA | EA | nBMA | St | VAc | (c) HEMA | DE | Monomer mixture (weight part) | Polymerization initiator Use amount (weight part) Successive | Later |
|---|---|---|---|---|---|---|---|---|---|---|---|
| Example 1 |  | 20 | 34 | 20 | 25 |  |  | 1 | 350 | 3.5 | 3 |
| Example 2 |  | 20 | 39 | 20 | 20 |  |  | 1 | 350 | 3.5 | 3 |
| Example 3 |  | 35 | 40 |  |  | 25 |  |  | 350 | 3.5 | 3 |
| Example 4 | 2 | 20 | 33 | 20 | 25 |  |  |  | 350 | 3.5 | 3 |
| Example 5 | 2 | 20 | 33 | 20 | 25 |  |  |  | 350 | 3.5 | 3 |
| Example 6 | 1 | 20 | 34 | 20 | 25 |  |  |  | 350 | 3.5 | 3 |
| Example 7 |  | 20 | 35 | 20 | 25 |  |  |  | 350 | 3.5 | 3 |
| Example 8 |  | 13 | 57 |  | 15 |  | 15 |  | 350 | 3.5 | 3 |
| Example 9 |  | 25 | 45 |  | 15 |  | 15 |  | 350 | 3.5 | 3 |
| Example 10 |  | 37 | 38 |  | 25 |  | 5 | 1 | 350 | 3.5 | 3 |
| Example 11 | 2 | 20 | 33 | 20 | 25 |  |  |  | 350 | 3.5 | 3 |
| Example 12 | 2 | 20 | 33 | 20 | 25 |  |  |  | 350 | 3.5 | 3 |
| Comparative example 1 |  | 20 | 35 | 20 | 25 |  |  |  | 350 | 3.5 | 3 |
| Comparative example 2 |  | 20 | 34 | 20 | 25 |  |  | 1 | 350 | 3.5 | 3 |
| Comparative example 3 |  | 20 | 40 | 20 | 20 |  |  |  | 350 | 3.5 | 3 |
| Comparative example 4 |  | 13 | 57 |  | 15 |  | 15 |  | 350 | 3.5 | 3 |

TABLE 4

| Experiment No. | Polymer (C) $SP_A$ | $SP_B$ | $SP_B - SP_A$ | $SP_C$ | (° C.) | $SP_C - SP_A$ | (B)/(C) | Acid value |
|---|---|---|---|---|---|---|---|---|
| Example 1 | 7.8 | 8.8 | 1.0 | 9.2 | 28 | 1.4 | 30/70 | 0.56 |
| Example 2 | 7.5 | 8.6 | 1.1 | 9.2 | 22 | 1.7 | 30/70 | 0.56 |
| Example 3 | 7.6 | 8.6 | 1.0 | 9.4 | 23 | 1.8 | 30/70 | 0.56 |
| Example 4 | 7.8 | 8.8 | 1.0 | 9.2 | 28 | 1.4 | 30/70 | 4.30 |
| Example 5 | 7.9 | 8.8 | 0.9 | 9.2 | 28 | 1.3 | 30/70 | 4.30 |
| Example 6 | 7.9 | 8.9 | 1.0 | 9.2 | 28 | 1.3 | 34/66 | 4.40 |
| Example 7 | 7.9 | 8.9 | 1.0 | 9.2 | 28 | 1.3 | 34/66 | 6.39 |
| Example 8 | 8.0 | 9.0 | 1.0 | 9.5 | 10 | 1.5 | 50/50 | 0.94 |
| Example 9 | 7.8 | 8.8 | 1.0 | 9.5 | 24 | 1.7 | 40/60 | 2.24 |
| Example 10 | 8.2 | 8.9 | 0.7 | 9.4 | 35 | 1.2 | 30/70 | 1.68 |

TABLE 4-continued

| Example 11 | 7.9 | 8.8 | 0.9 | 9.2 | 28 | 1.3 | 30/70 | 4.30 |
| Example 12 | 7.9 | 8.8 | 0.9 | 9.2 | 28 | 1.3 | 30/70 | 4.30 |
| Comparative example 1 | 7.8 | 8.8 | 1.0 | 9.2 | 28 | 1.4 | 30/70 | 0 |
| Comparative example 2 | 7.8 | 9.0 | 1.2 | 9.2 | 28 | 1.4 | 30/70 | 4.68 |
| Comparative example 3 | 7.8 | 8.6 | 0.8 | 9.2 | 28 | 1.4 | 30/70 | 1.68 |
| Comparative example 4 | 8.7 | 9.0 | 0.3 | 9.5 | 10 | 0.8 | 50/50 | 0.94 |

| | Item | | | | |
|---|---|---|---|---|---|
| | Chelate compound | | Nonaqueous dispersion type emulsion | | |
| Experiment No. | Kind | Use amount (weight part)* | Solid content (weight %) | Viscosity (cps) | Particle size ($\mu$m) |
| Example 1 | | | 50.0 | 9700 | 0.4 |
| Example 2 | | | 50.2 | 6800 | 0.4 |
| Example 3 | | | 50.1 | 4600 | 0.7 |
| Example 4 | | | 55.0 | 4400 | 0.5 |
| Example 5 | ATAA | 0.83 | 55.1 | 5200 | 0.5 |
| Example 6 | ATAA | 0.83 | 55.0 | 7100 | 0.6 |
| Example 7 | ATAA | 1.23 | 55.2 | 9800 | 0.6 |
| Example 8 | | | 55.1 | 2500 | 0.7 |
| Example 9 | | | 70.3 | 3900 | 0.7 |
| Example 10 | | | 50.0 | 3000 | 0.5 |
| Example 11 | TBAA | 0.83 | 55.1 | 5200 | 0.5 |
| Example 12 | ZTAA | 0.83 | 55.0 | 5200 | 0.5 |
| Comparative example 1 | | | 50.0 | 9000 | 0.4 |
| Comparative example 2 | | | Stable dispersion could not be obtained | | |
| Comparative example 3 | | | 50.1 | 7300 | 0.5 |
| Comparative example 4 | | | 55.1 | 14500 | Dissolved |

* . . . Based on 100 weight parts of the total of the polymers B and C

Some of the non-aqueous dispersion type emulsions obtained in Examples and Comparative examples were made into paint, and paint evaluation tests were con- ducted.
Evaluation tests of paint
(1) Paint storage stability test
A paint obtained as later-described was adjusted so that the viscosity can be 2,000 to 2,500 cps, using, if necessary, the organic solvent "Laws", and then sealed into a glass bottle and left alone at room temperature for one month, and the state variation of the paint was observed. Further, after the paint was adequately stirred, gloss was measured accord- ing to the method of the later item (3), and evaluation was made based on the following criterion.

○ . . . Sedimentation of the pigment and formation of a supernatant are not observed. There is almost no change on the gloss of coat between before and after storage.

Δ . . . Sedimentation of the pigment and formation of a supernatant are observed in a small extent. There is almost no change on the gloss of coat between before and after storage.

X . . . Sedimentation of the pigment and formation of a supernatant are observed. Gloss after storage is strik- ingly decreased compared with that before storage.

(2) Lifting property test
A ground steel plate prescribed in JIS G 3141 (SPCC-SB) was coated with an alkyd resin rust preventing paint (rust preventing paint of the second kind prescribed in JIS K 5621) using a brush so that the amount 2 could be about 150 g/m². After drying the applied paint at 20° C. and 70% RH for 48 hours, a paint obtained as later-described was applied thereon using a brush so that the amount could be about 150 g/m² and dried at 20° C. and 70% RH for 24 hours. At the point of time, the coat state was observed, and evaluation was made according to the following criterion. In accor- dance with to what degree the undercoat alkyd resin rust preventing paint was affected with the organic solvent contained in the paint, abnormality was observed on the coat surface.

○ . . . Shrinkage, wrinkle, etc. do not occur

Δ . . . Shrinkage partially occurs, but wrinkle does not occur

X . . . Shrinkage and wrinkle occur throughout the surface (3) Gloss measurement
A paint obtained as later-described was adjusted so that the viscosity could be 2,000 to 2,500 cps, using, if necessary, the organic solvent "Laws", applied onto a glass plate using a 6 mil doctor blade, and dried at room temperature for 7 days. Then, 600 gloss was measured by a variable angle glossimeter "TC-108D" (manufactured by Tokyo Denshoku Co., Ltd.).

(4) Preparation of specimens
(4-1) Specimens for adhesive properties test
A paint obtained as later-described was adjusted so that the viscosity could be 2,000 to 2,500 cps, using, if necessary, the organic solvent "Laws", applied once by a brush onto a test base material so that the wet thickness could be about 150 g/m², and dried at room temperature for one week: (when a melamine resin was used as the crosslinking agent, drying was conducted at 100° C. for 5 minutes and then baking is conducted at 160° C. for 30 minutes) to give a specimen for an adhesive properties test. As test base materials, the following ones were used.

Steel plate . . . A ground steel plate prescribed in JIS G 3141 (SPCC-SB) was degreased with toluene and used.

Zinc steel plate . . . A zinc plated steel plate prescribed in JIS G 3302 (SGH 340) was degreased with toluene and used.

Rust preventing coat . . . A ground steel plate prescribed in JIS G 3141 (SPCC-SB) was coated once with an alkyd resin rust preventing paint (rust preventing paint of the second kind prescribed in JIS K5621) using a brush so that the wet thickness could be about 150 g/m², dried at room temperature for one week, and used.

Elastic coat . . . A flexible plate treated with a solvent type under coater was coated with an aqueous emulsion type elastic paint using a doctor blade so that the dry thickness could be about 1 mm, dried at room temperature for one day, and used.

Flexible board . . . A flexible board prescribed in JIS A 5403 (F) was used.

(4-2) Specimen for coat test

A paint obtained as later-described was adjusted so that the viscosity could be 2,000 to 2,500 cps, using, if necessary, the organic solvent "Laws", applied twice by a brush onto the flexible board so that the wet thickness could be about 150 g/m$^2$, and dried at room temperature for one week. Then, 60° gloss was measured by a variable angle glossimeter in the same manner as in the above item (3), and the resultant sheet was used as a specimen for various coat tests.

(5) Adhesive properties test

Adhesive properties were evaluated according to the crosscut adhesion test prescribed in JIS K 5400, using a specimem prepared in the above item (4-1). The interval and number of the cells of the crosscutting were 2 mm and 100, respectively. Evaluation of adhesive properties was represented by scores according to the following criterion.

Score 10 . . . Each cut is thin and both sides thereof are smooth, and any cell, which is square, is not peeled from the intersections of the cuts.

Score 8 . . . There is slight peeling at the intersections of the cuts, but any cell is not peeled, and the area of the spoiled portions is within 5% of the total area of the cells.

Score 6 . . . There is peeling at the intersections and both sides of the cuts, and the area of the spoiled portions is 5 to 15% of the total area of the cells.

Score 4 . . . The width of peeling due to the cuts is wide, and the area of the spoiled portions is 15 to 35% of the total area of the cells.

Score 2 . . . The width of peeling due to the cuts is wider than that in the Score 4, and the area of the spoiled portions is 35 to 65% of the total area of the cells.

Score 0 . . . The area of peeling is 65% or more of the total area of the cells.

(6) Coat test (6-1) Water resistance test

A specimen prepared in the above item (4-2) was immersed in deionized water for 7 days, and presence of blister occurrence on the coat was observed. The resultant specimen was left alone at room temperature for 2 hours, 60° gloss was measured by a variable angle glossimeter in the same manner as in the above item (3) to determine the gloss retention rate, and evaluation as made according to the following criterion.

⊙ . . . There is no blister, and the gloss retention rate is 90% or more.

○ . . . There is no blister, and the gloss retention rate is 70 to 90%.

Δ . . . Blister occurs partially, and the gloss retention rate is 50 to 70%.

X . . . Blister occurs throughout the surface, and the gloss retention rate is under 50%.

(6-2) Alkali resistance test

A specimen prepared in the above item (4-2) was immersed in 5 weight % aqueous sodium hydroxide solution for 2 days, then taken out and washed mildly with flowing water, and presence of changes of the coat such as blister was observed. The resultant specimen was left alone at room temperature for 2 hours, 60° gloss was measured by a variable angle glossimeter in the same manner as in the above item (3) to determine the gloss retention rate, and evaluation was made according to the criterion described in the above item (6-1).

(6-3) Weatherability test

A specimen prepared in the above item (4-2) was subjected to 720 hours-test according to the item 5 of JIS A 1415 using a sunshine carbon arc lamp type weather-O-meter prescribed in JIS B 7753, and then, 600 gloss was measured by a variable angle glossimeter in the same manner as in the above item (3) to determine the gloss retention rate.

Preparation of paint

Example 21

100 weight parts of the non-aqueous dispersion type emulsion obtained in Example 1 and 50 weight parts of "Tipaque CR-90" (rutile type titanium oxide powder; manufactured by Ishihara Sangyo Co., Ltd.) were put in a sand mill, and sufficiently kneaded, and then, 16 weight parts of the organic solvent "Laws" was added to prepare a paint. The paint had a solid content of 60 weight %, a viscosity of 9,000 cps and a pigment weight concentration (PWC) of 50 weight %. The above paint evaluation tests and coat tests were conducted using the paint. The solid content, viscosity and PWC of the paint, and the results of the paint evaluation tests and coat tests were shown in Table 5.

Examples 22 and 27 and Comparative Examples 11 and 12

A paint was prepared in the same manner as in Example 21 except for, in Example 21, using the non-aqueous dispersion type emulsion obtained in any of Example 2, Example 10, Comparative example 1 and Comparative example 3 instead of using the non-aqueous dispersion type emulsion obtained in Example 1. The above paint evaluation tests and coat tests were conducted using the paint. The solid content, viscosity and PWC of the paint, and the results of the paint evaluation tests and coat tests were shown in Table 5.

Examples 23 to 26, 28 and 29

A paint was prepared in the same manner as in Example 21 except for, in Example 21, using 91 weight parts of the non-aqueous dispersion type emulsion obtained in any of Examples 4 to 7, Example 11 and Example 12 instead of 100 weight parts of using the non-aqueous dispersion type emulsion obtained in Example 1, and adding 25 weight parts of the organic solvent "Laws" instead of adding 16 weight parts thereof. The above paint evaluation tests and coat tests were conducted using the paint. The solid content, viscosity and PWC of the paint, and the results of the paint evaluation tests and coat tests were shown in Table 5.

Comparative Example 13

A paint was prepared in the same manner as in Example 21 except for, in Example 21, using 91 weight parts of the non-aqueous dispersion type emulsion obtained in Comparative example 4 instead of using 100 weight parts of the non-aqueous dispersion type emulsion obtained in Example 1, and adding 25 weight parts of the organic solvent "Solvesso 100" instead of adding 16 weight parts of the organic solvent "Laws". The above paint evaluation tests and coat tests were conducted using the paint. The solid content, viscosity and PWC of the paint, and the results of the paint evaluation tests and coat tests were shown in Table 5.

Example 30

A paint was prepared in the same manner as in Example 21 except for, in Example 21, using 91 weight parts of the non-aqueous dispersion type emulsion obtained in Example 8 instead of using 100 weight parts of the non-aqueous dispersion type emulsion obtained in Example 1. The solid content, viscosity and PWC of the paint were shown in Table 5.

Then, an isocyanate crosslinking agent "Burnock DN-990" (trimer type of HMDI isocyanate; manufactured by DAINIPPON INK AND CHEMICALS, INC.) was added to and mixed with the paint immediately before application so that the OH group in the paint and the NCO group in the crosslinking agent could be the same equivalent, and the above paint evaluation tests and coat tests were conducted. The results of the paint evaluation tests and coat tests were shown in Table 5.

Example 31

A paint was prepared in the same manner as in Example 30 except for, in Example 30, using 71 weight parts of the non-aqueous dispersion type emulsion obtained in Example 9 instead of using 91 weight parts of the non-aqueous dispersion type emulsion obtained in Example 8. The solid content, viscosity and PWC of the paint were shown in Table 5. Then, an isocyanate crosslinking agent "Burnock DN-990" was added to and mixed with the paint immediately before application in the same manner as in Example 30, and the above paint evaluation tests and coat tests were conducted. The results of the paint evaluation tests and coat tests were shown in Table 5.

Preparation of kneaded pigment 60 weight parts of the polymer (B) solution obtained in Reference example 2,500 weight parts of "Tipaque CR-90" and 175 weight parts of "Laws" were kneaded sufficiently in a sand mill to give a kneaded pigment having a solid content of 72 weight %.

Example 32

47 weight parts of the non-aqueous dispersion type emulsion obtained in Example 1 and 73.5 weight parts of the above kneaded pigment were sufficiently stirred to give a paint. The obtained paint had a solid content of 60 weight %, a viscosity of 8,500 cps and a pigment weight concentration (PWC) of 50 weight %. The above paint evaluation tests and coat tests were conducted using the paint. The solid content, viscosity and PWC of the paint, and the results of the paint evaluation tests and coat tests were shown in Table 5.

Example 33

A paint was prepared in the same manner as in Example 32 except for, in Example 32, using the non-aqueous dispersion type emulsion obtained in Example 4 instead of using the non-aqueous dispersion type emulsion obtained in Example 1. The above paint evaluation tests and coat tests were conducted using the paint. The solid content, viscosity and PWC of the paint, and the results of the paint evaluation tests and coat tests were shown in Table 5.

Example 34

134 weight parts of the non-aqueous dispersion type emulsion obtained in Example 9 and 147 weight parts of the above kneaded pigment were sufficiently stirred, 12 weight parts of "Laws" and 30 weight parts of hexamethylol tetramethylated monobutylated melamine were added, and the mixture was warmed to 50° C., stirred for 20 minutes and left alone at room temperature for 24 hours. The resultant paint was applied onto the above ground steel plate using a 6 mil-doctor blade, dried at 100° C. for 5 minutes, and baked at 160° C. for 30 minutes. The formed coat had high gloss (60° gloss 90), did not change at all when immersed in toluene and was also excellent in adhesive properties to the base material.

Examples 35 to 36

60 weight parts of the non-aqueous dispersion type emulsion obtained in Example 2 or Example 3, 35 weight parts of "Tipaque CR-90", 35 weight parts of "Sunlight # 1000" (calcium carbonate powder; manufactured by Takehara Kagaku Co., Ltd.) and 12 weight parts of "Laws" were kneaded sufficiently in a sand mill, and further 5 weight parts of "Laws" was added to give a paint. The above paint evaluation tests and coat tests were conducted using the paint. The solid content, viscosity and PWC of the paint, and the results of the paint evaluation tests and coat tests were shown in Table 5.

Further, the paint was left alone at room temperature for one month, and then, the state of the paint and change of gloss of the coat on the left paint were observed, but any change was not observed, and the paint was stable.

TABLE 5

| | | Characteristic values of paint | | | Physical properties of paint | | |
|---|---|---|---|---|---|---|---|
| Experiment No. | Nonaqueous dispersion type emulsion | Viscosity (cps) | Solid content (weight %) | PWC (weight %) | Storage stability | Lifting properties | Crosslinking agent |
| Example 21 | Example 1 | 9000 | 60 | 50 | ○ | ○ | — |
| Example 22 | Example 2 | 7800 | 60 | 50 | ○ | ○ | — |
| Example 23 | Example 4 | 3400 | 60 | 50 | ○ | ○ | — |
| Example 24 | Example 5 | 3200 | 60 | 50 | ○ | ○ | — |
| Example 25 | Example 6 | 3500 | 60 | 50 | ○ | ○ | — |
| Example 26 | Example 7 | 3800 | 60 | 50 | ○ | ○ | — |
| Example 27 | Example 10 | 3400 | 60 | 50 | ○ | Δ | — |
| Example 28 | Example 11 | 3300 | 60 | 50 | ○ | ○ | — |
| Example 29 | Example 12 | 3200 | 60 | 50 | ○ | ○ | — |
| Comparative example 11 | Comparative example 1 | 11000 | 60 | 50 | X | ○ | — |

TABLE 5-continued

| | | | | | | | | |
|---|---|---|---|---|---|---|---|---|
| Comparative example 12 | Comparative example 3 | 8000 | 60 | 50 | X | ○ | — |
| Comparative example 13 | Comparative example 4 | 5500 | 60 | 50 | X | X | — |
| Example 30 | Example 8 | 2800 | 64 | 50 | ○ | ○ | DN-990 |
| Example 31 | Example 9 | 2400 | 73 | 50 | ○ | ○ | DN-990 |
| Example 32 | Example 1 | 8500 | 60 | 50 | ○ | ○ | — |
| Example 33 | Example 4 | 7400 | 60 | 50 | ○ | ○ | — |
| Example 35 | Example 2 | 2400 | 68 | 70 | ○ | ○ | — |
| Example 36 | Example 3 | 2000 | 68 | 70 | ○ | ○ | — |
| Comparative example 14 | Comparative example 3 | 3000 | 68 | 70 | X | ○ | — |

| | | Item Physical properites of paint coat | | | | | | |
|---|---|---|---|---|---|---|---|---|
| | | Adhesive properties | | | | | Water | Alkali | Weather |
| Experiment No. | Gloss | Steel plate | Zinc steel plate | Rust pre-venting coat | Elastic coat | Flexible board or FB | resist-ance | resist-ance | resistance (%) |
| Example 21 | 86 | 8 | 10 | 8 | 10 | 8 | ⊙ | ⊙ | 76 |
| Example 22 | 88 | 10 | 10 | 8 | 10 | 8 | ⊙ | ⊙ | 76 |
| Example 23 | 92 | 10 | 10 | 8 | 10 | 10 | ⊙ | ○ | 71 |
| Example 24 | 92 | 10 | 10 | 8 | 10 | 10 | ⊙ | ⊙ | 85 |
| Example 25 | 92 | 10 | 10 | 8 | 10 | 10 | ⊙ | ⊙ | 88 |
| Example 26 | 92 | 10 | 10 | 6 | 10 | 10 | ⊙ | ⊙ | 90 |
| Example 27 | 86 | 10 | 10 | 10 | 10 | 10 | ⊙ | ○ | 71 |
| Example 28 | 88 | 10 | 10 | 8 | 10 | 10 | ⊙ | ⊙ | 85 |
| Example 29 | 90 | 10 | 10 | 8 | 10 | 10 | ⊙ | ⊙ | 85 |
| Comparative example 11 | 40 | 0 | 0 | 0 | 0 | 6 | ○ | ○ | 72 |
| Comparative example 12 | 79 | 0 | 2 | 0 | 2 | 8 | ○ | ○ | 76 |
| Comparative example 13 | 74 | 10 | 10 | Evaluation was impossible because of lifting | | 10 | Δ | X | 62 |
| Example 30 | 92 | 10 | 10 | 10 | 10 | 10 | ⊙ | ⊙ | 92 |
| Example 31 | 94 | 10 | 10 | 10 | 10 | 10 | ⊙ | ⊙ | 90 |
| Example 32 | 88 | 8 | 10 | 8 | 10 | 8 | ⊙ | ⊙ | 76 |
| Example 33 | 92 | 10 | 10 | 10 | 10 | 10 | ⊙ | ⊙ | 71 |
| Example 35 | 5 | 8 | 10 | 8 | — | 8 | ⊙ | ⊙ | — |
| Example 36 | 5 | 8 | 10 | 4 | — | 8 | ⊙ | ⊙ | — |
| Comparative example 14 | 5 | 0 | 0 | 0 | — | 8 | ○ | ○ | — |

Industrial Applicability

Since the coating resin composition according to the invention is excellent in pigment dispersibility and adhesive properties to various base material surfaces, and can be made to have high solid content and can be applied thick, it can be used as a coating agent directly applicable to inorganic base materials, wooden base materials, metallic base materials, etc., and since it has excellent adhesive properties also to the coat surfaces of aqueous emulsion type paint and alkyd resin paint coat surfaces, it can be used as a repairing coating agent capable of being applied on the existing paint coat, and, further, since the coat of the substrate is affected in less degree by the organic solvent contained therein, it can be used as a topcoating agent for rust preventing coat for metal, aqueous spray tile coat, etc. Still further, it can give excellent physical properties such as water resistance, alkali resistance and weatherability even to coat obtained by ordinary temperature drying.

Thus, the coating resin composition according to the invention can be utilized widely for inside and outside coating of buildings, structures, etc. and automobile repairing coating.

We claim:

1. A coating resin composition comprising (A) an organic solvent comprising an aliphatic hydrocarbon solvent as a main component, (B) an acrylic polymer which contains therein 0.2 to 30 weight % of a repeating unit represented by the following formula

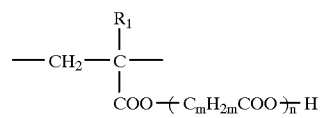

(I)

wherein $R_1$ represents a hydrogen atom or methyl group, m is an integer of 3 to 11, and n is a number of 1 to 10, and is soluble in the above organic solvent (A), (C) polymer fine particles substantially insoluble in the above organic solvent (A), and a crosslinking agent;

wherein the organic solvent (A) has a solubility parameter SP value within the range of 7.2 to 8.2, and wherein the respective solubility parameter SP values of the organic solvent (A), the acrylic polymer (B) and the polymer fine particles (C) satisfy the following relation:

$$0.5 \leq SP_B - SP_A \leq 1.2$$

$$1.2 \leq SP_C - SP_A \leq 3.0 \text{ and}$$

$$SP_C \leq SP_B$$

wherein $SP_A$, $SP_B$ and $SP_C$ represent the solubility parameter SP values of the organic solvent (A), the acrylic polymer (B) and the polymer fine particles (C), respectively.

2. The composition according to claim 1 wherein the crosslinking agent is a metal chelate compound.

3. The composition according to claim 2 wherein the metal chelate compound is selected from an aluminum chelate compound, a titanium chelate compound and a zirconium chelate compound.

4. The composition according to claim 1 wherein the crosslinking agent is selected from an amino resin, a polyisocyanate compound and a polyepoxy compound.

5. The composition according to claim 1 wherein the aliphatic hydrocarbon solvent has a boiling point within about 95 to about 220° C.

6. The composition according to claim 1 wherein the organic solvent (A) contains 50 weight % or more of the aliphatic hydrocarbon solvent.

7. The composition according to claim 1 wherein the organic solvent (A) has an aniline point within 10 to 90° C.

8. The composition according to claim 1 wherein the acrylic polymer (B) contains therein 0.5 to 20 weight % of the repeating unit of the formula (I).

9. The composition according to claim 1 wherein, in the formula (I), m is 5 and n is 1 to 6.

10. The composition according to claim 1 wherein the acrylic polymer (B) has a weight average molecular weight within the range of 10,000 to 300,000.

11. The composition according to claim 1 wherein the acrylic polymer (B) has a glass transition temperature (Tg) within the range of 0 to 60° C.

12. The composition according to claim 1 wherein the acrylic polymer (B) is one obtained by copolymerizing (a) a monomer represented by the formula $$CH_2=\overset{R^1}{\underset{|}{C}}-COO(C_mH_{2m}COO)_{\overline{n}}H \tag{II}$$

wherein $R^1$, m and n have the same meanings as defined in claim 1, and (b) a monomer represented by the formula $$CH_2=\overset{R^2}{\underset{|}{C}}-Y \tag{III}$$

wherein, $R^2$ represents a hydrogen atom or a methyl group,

Y represents a hydrogen atom, a $C_1$ to $C_2$ alkyl group, a $C_2$ to $C_4$ alkenyl group, a $C_6$ to $C_8$ aryl group, —CN, —COOR$^3$ or —OCOR$^4$, wherein $R^3$ represents a $C_1$ to $C_{18}$ alkyl group, $C_6$ to $C_8$ cycloalkyl group or $C_7$ to $C_{12}$ aralkyl group wherein at least part of the hydrogen atoms of those groups can be substituted with fluorine atoms(s), and $R^4$ represents a $C_1$ to $C_{12}$ alkyl group, and, if desired, (c) an unsaturated monomer containing a crosslinkable functional group.

13. The composition according to claim 1 wherein the polymer fine particles (C) have an average particle size within the range of about 0.05 to about 5 μm.

14. The composition according to claim 1 wherein the polymer fine particles (C) have a glass transition temperature (Tg) within the range of −10° C. to 50° C.

15. The composition according to claim 1 wherein the composition is prepared by polymerizing monomer(s) for constituting the polymer fine particles (C) in the organic solvent (A) in the presence of the acrylic polymer (B).

16. The composition according to claim 1 comprising 20 to 70 weight % of the organic solvent (A), 3 to 56 weight % of the acrylic polymer (B), and 9 to 64 weight % of the polymer fine particles (C).

17. The composition according to claim 1 wherein the solid content is within the range of 40 to 80 weight %.

* * * * *